United States Patent [19]

Dufour

[11] 3,815,895
[45] June 11, 1974

[54] JAM DETECTOR SYSTEM
[75] Inventor: Charles H. Dufour, Westerly, R.I.
[73] Assignee: Harris-Intertype Corporation, Cleveland, Ohio
[22] Filed: Dec. 7, 1970
[21] Appl. No.: 95,442

[52] U.S. Cl. .................................. 270/56, 271/57
[51] Int. Cl. ............................................. B65h 43/02
[58] Field of Search .................. 270/37, 56; 271/57

[56] References Cited
UNITED STATES PATENTS
| | | | |
|---|---|---|---|
| 2,122,796 | 7/1938 | Horton | 270/56 X |
| 3,575,411 | 4/1971 | Kastelic | 271/57 |
| 3,588,085 | 6/1971 | Bailey et al. | 270/37 |

*Primary Examiner*—Robert W. Michell
*Assistant Examiner*—Vance Y. Hum

[57] ABSTRACT

A jam detector system for a folder in which photocells are placed at strategically located inspection stations to inspect for wrongfully present and wrongfully absent signatures. A timing mechanism operating synchronously with the folder provides gating signals which cause an inspection to be made both at times when a signature is expected and when no signature is supposed to be present. The signals from the inspecting photocells are combined with the gating signals to provide the logic for a logic circuit which, when a fault is detected, is operable to stop the folder. The system is also operative to stop the folder in the event of a malfunction, such as a burned out light source, in the detector system.

15 Claims, 11 Drawing Figures

PATENTED JUN 11 1974  3,815,895
SHEET 1 OF 4
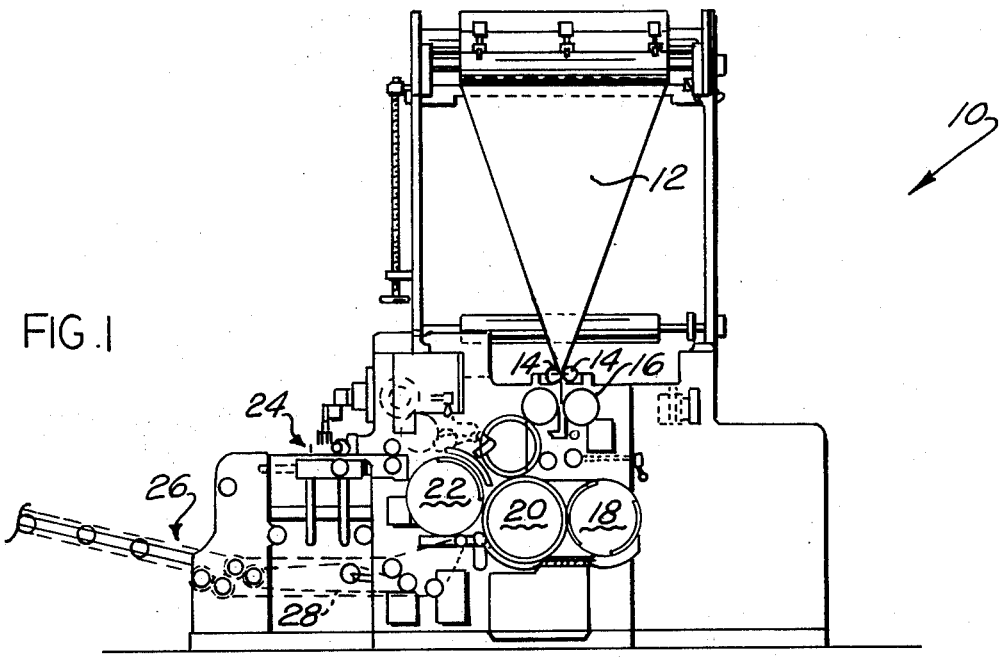
FIG.1
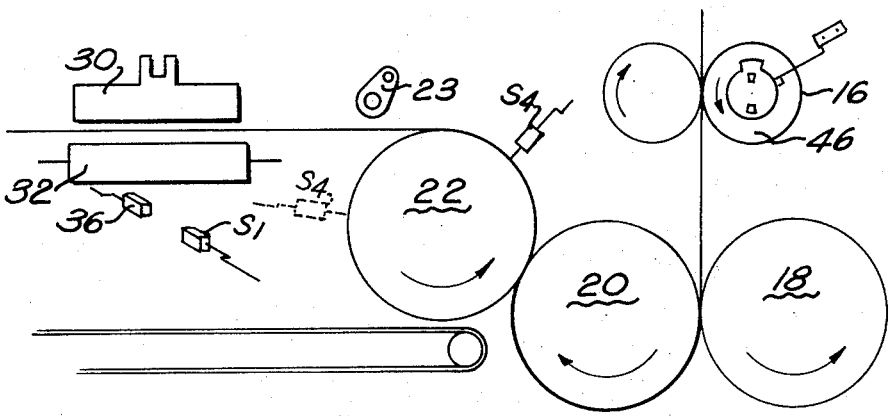
FIG.2
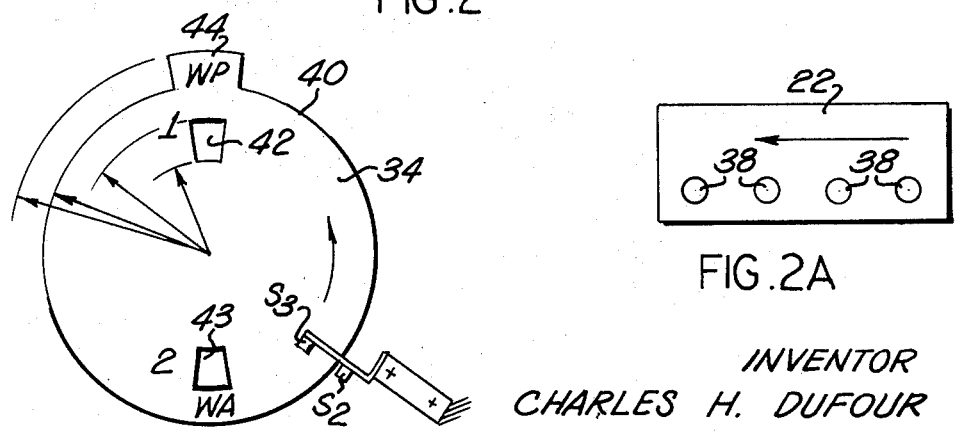
FIG.3
FIG.2A
INVENTOR
CHARLES H. DUFOUR
BY Young and Tarolli
ATTORNEYS

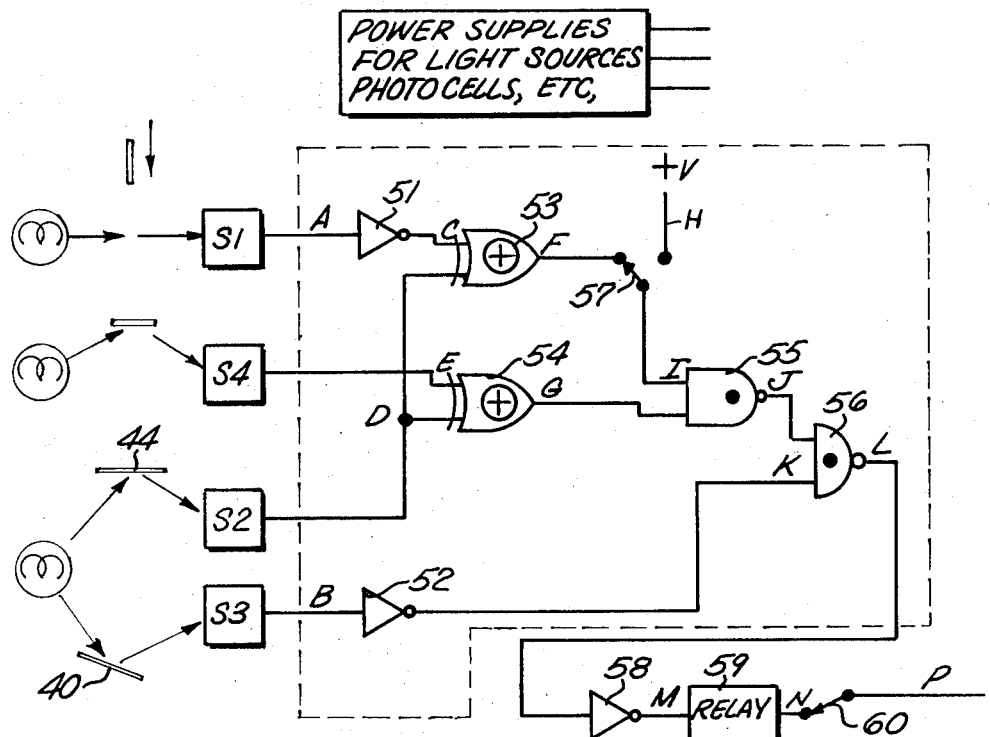
FIG. 4
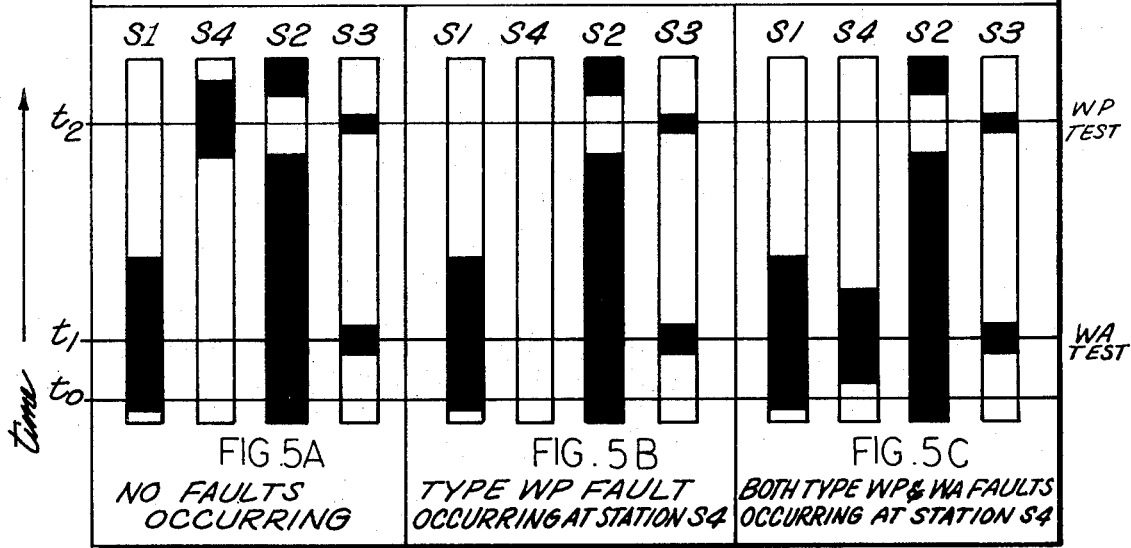

| S1 | S4 | S2 | S3 | |
|---|---|---|---|---|
| 1=BOOK ABSENT 0=BOOK PRESENT | 1=BOOK PRESENT 0=BOOK ABSENT | 1=TOOTH PRESENT 0=TOOTH ABSENT | 1=OPENING ABSENT 0=OPENING PRESENT | |
| 1 | 1 | 1 | 1 | 1 |
| 1 | 1 | 1 | 0 | 2 |
| 1 | 1 | 0 | 1 | 3 |
| 1 | 0 | 0 | 0 | 4 |
| 1 | 0 | 1 | 1 | 5 |
| 1 | 0 | 0 | 0 | 6 |
| 0 | 0 | 1 | 1 | 7 |
| 0 | 0 | 0 | 0 | 8 |
| 0 | 1 | 1 | 1 | 9 |
| 0 | 1 | 0 | 0 | 10 |
| 0 | 1 | 1 | 1 | 11 |
| 0 | 0 | 0 | 0 | 12 |
| 0 | 0 | 1 | 1 | 13 |
| 0 | 0 | 0 | 0 | 14 |
| 0 | 0 | 0 | 1 | 15 |
| 0 | 0 | 0 | 0 | 16 |

SHUTDOWN #1
SHUTDOWN #2 ONLY IF S1 IS BEING USED (CHOPPER)
SHUTDOWN #3
SHUTDOWN #4
SHUTDOWN #5 ONLY IF S1 IS BEING USED
SHUTDOWN #6

NOTE: SHUTDOWN #2 & #3 DETECT DEFECTIVE S2, S3 LIGHT SOURCE
SHUTDOWN #4 & #5 DETECT DEFECTIVE S1 LIGHT SOURCE
SHUTDOWN #6 DETECT DEFECTIVE S4 LIGHT SOURCE

FIG. 6

JAM DETECTOR SYSTEM

This invention broadly relates to the field of apparatus for processing a plurality of spaced apart articles through a predetermined path and, more particularly, to a detection system for use with a folder to detect any deviation from the proper sequencing of operations as a book passes through the folder.

Although the invention will be described as applied to a folder for use with a printing press, it will be understood that the principles of the invention have broader application and may be utilized with any apparatus for processing a plurality of articles through a predetermined path.

During normal operation of a folder, the signatures are processed automatically by the folder by the appropriate cylinders, folding blades, grippers, rollers, etc.. If, while the required sequence of folding operations is being performed, the paper should jam, it is highly desirable to stop the machine as quickly as possible in order to minimize the time required for an operator to clear the jammed signatures. It will be appreciated that when folders are operated at high speeds and a jammed condition occurs, substantial time may elapse before the operator detects the jam and stops the machine. Since paper continues to enter the folder, a jam results in paper wedging tightly in the machine, requiring a long time to clear, and may even result in breakage of the machinery.

It is the principal object of this invention to provide a jam detection system for use with a folder which is operable to detect jams anywhere in the folder and automatically shut down the press and folder.

It is a further object of this invention to provide a jam detection system which is fail-safe in operation and inexpensive to produce.

It is another object of this invention to provide a jam detection system which may readily be incorporated in existing folders.

In accordance with the principles of this invention, the jam detection system operates on the basis that, during normal folder operation, signatures in various stages of completion are present at certain places in the folder at certain times. Accordingly, the detection system employs inspection stations which are arranged to inspect for the presence or absence of signatures at predetermined times in the folder's sequence of operations. If, at any time, a signature is absent from an inspection station when normally it should be present or a signature is present at a time when it should be absent, the detection system is actuated automatically to shut down the press.

In the preferred form of the invention, an inspection for the wrongful presence of a signature and an inspection for the wrongful absence of a signature is made for each signature or book cycle.

More specifically, the detection system of this invention employs photocells at strategically located inspection stations in the folder with the photocells being operable to sense the presence or absence of light and to generate a signal in accordance with the condition sensed. A timing mechanism which is a synchronous component of the folder provides signals which cause an inspection to be made of the scene passing under the inspection stations both at times when a signature is expected and again when no signature is supposed to be present. The signals generated by the photocells in the detection system are combined in a logic circuit such that, when a signature is either wrongfully absent or wrongfully present at an inspection station, an output voltage is produced to shut down the press and the folder.

The system is designed to be fail-safe in that it has the ability to detect burned out or dust covered light sources and will shut down the folder upon such an occurrence.

Referring now to the drawings wherein like reference numerals indicate like parts in the various views;

FIG. 1 is an elevation view of one type of folder in which the detection system may be employed;

FIG. 2 is a schematic illustration of the detection system as it may be incorporated in the folder;

FIG. 2A is a schematic illustration of the developed surface of the delivery cylinder;

FIG. 3 is an enlarged view of the timing disc and its associated photocells;

FIG. 4 is a schematic diagram of one form of a logic circuit which may be used in the detection system;

FIGS. 5A, 5B and 5C are charts showing the light falling on the photocells as a function of time;

FIG. 6 is the truth table on which the logic circuit of FIG. 4 is based;

Figure 7:
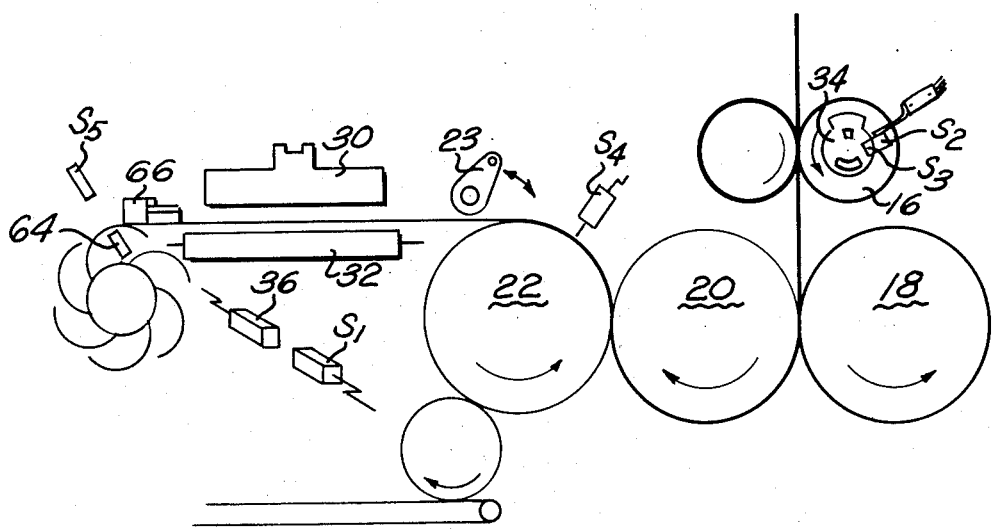
FIG. 7 is a schematic illustration of the detection system incorporated in a modified form of folder.

Referring now more in detail to the drawings wherein the showings are for purposes of illustrating a preferred embodiment of the invention only and not for purposes of limiting same, there is illustrated in FIG. 1 one type of folder on which the jam detection system of the instant invention may be incorporated. This folder, indicated generally by the reference numeral 10, is of the type commercially available as an M-1000 combination folder from the Cottrell Company, Division of Harris-Intertype Corporation. Although the folder itself forms no part of the invention, the components of the folder with which the detector system is associated will be described to facilitate an understanding of this invention. Thus, the folder includes a former board 12, former rollers 14, cross perforator cylinders 16, pin cylinder 18, jaw cylinder 20 and a gripper jaw delivery cylinder 22. In addition, the folder includes a chopper folder assembly 24 to produce chopper folds in a manner well known in the art. A delivery section 26 including a belt delivery 28 is also included.

The folder operates in the following manner. A web is carried from the printing press across the former board 12 whereby a longitudinal fold is placed in the web. The folded web then passes through the former rollers 14 to the cross-perforator cylinders 16 which perforate across the web where the next fold is to be made. The web then passes between the cylinders 18 and 20 where the cylinder 18 cooperates with the cylinder 20 both to sever the web to produce separate signatures for the remaining folding operations and also to produce a jaw fold at right angles to the fold produced by the former. The severed and folded signature is then carried by the jaw cylinder 20 to the cylinder 22 where a third fold parallel to the second fold may be placed in the signature by cooperation of the two cylinders 20 and 22. If the latter fold is not desired, the cylinder 22 merely grips the signature carried by cylinder 20 and ranged to rotate beneath S3 while the tooth 44 is arranged to rotate past S2.

The surface 46 on the end of cross-perforator cylinder 16 should be painted to provide a non-reflective surface as a background for the disc 34.

From the foregoing it will be apparent that the detection system employs a chopper cylinder inspection station at photocell S1, a delivery cylinder inspection station at photocell S4 and a pair of synchronizing signal generators S2 and S3 which cause an inspection to be made of the scene passing under the inspection stations S1 and S4 both at times when a signature is expected and again when no signature should be present.

As shown in FIG. 2A, there are four non-reflective areas 38 on the cylinder 22. For each revolution of the timing disc 34, two inspections will occur at the delivery cylinder station. One inspection will occur when the cells S2 and S3 are looking at the tooth 44 and the opening 42. This inspection should not find a signature covering one of the non-reflective surfaces 38 on the cylinder 22 thereby reflecting no light to photocell S4 and confirming that there is no wrongful presence of a signature. The other inspection will be initiated when the cell S3 is aligned with the opening 43. This inspection is to determine the wrongful absence of a signature and at this point in time, the cylinder 22 should have rotated to a position where the next adjacent non-reflective surface 38 is aligned with the photocell S4 but a signature covers it and reflects light onto S4, thereby confirming that there is no wrongful absence of a signature in the folder. Since the timing disc 34 rotates twice for each revolution of the delivery cylinder 22, four non-reflective areas 38 are required on the cylinder 22. Thus, two wrongful absence inspections and two wrongful present inspections occur for each complete revolution of the delivery cylinder.

The size of the non-reflective areas 38 on the cylinder 22 each should be sufficiently large that the time required for each area to pass beneath the cell S4 is greater than the time required for the tooth 44 and the opening 42 to pass between the cells S2 and S3.

It will be appreciated by those skilled in the art that the cylinders 18, 20 and 22 perform their respective operations within 180° of rotation so that, during operation of the folder, the cylinder 20 will be carrying one signature to the cylinder 22 while at the same time folding a second signature. Moreover, since the various folding and cutting operations require a plurality of jaws, tucking blades, cutters and pins, it is important that each component functions in the proper time sequence to insure the proper progress of each signature through the folder. Should any one of the components fail to perform the necessary operation at the proper , a jammed condition may result.

In accordance with the principles of this invention, a detection system is employed in combination with the folder, the system being operable to detect either wrongful absence or wrongful presence of a signature at any point in the folder. Such system provides an arrangement whereby the press and folder are shut down immediately upon detection of an irregular...

More specifically, this invention contemplates a detection system consisting of a plurality of inspecting cells S1, S2, S3 and S4. The photocells S1 and S4 being cells which inspect for irregularities and cells S2 and S3 generate signals which cause cells S1 and S4 to inspect at the proper time. Photocell S1 is located at a chopper inspection station beneath the chopper blade 30 and between the stripper rolls 32 and the chopper fan (not shown). Photocell S4 is located at a delivery cylinder station adjacent the cylinder 22. The cells S2 and S3 are located adjacent a timing disc, 34, which may be secured for synchronous rotation by the reference numeral 34, which may be secured for synchronous rotation with the perforator cylinders 16.

The cell passes between a light source...

...ature to the delivery mechanism is desired, a stripper throwoff mechanism 24. If a chopper fold is desired, a stripper throwoff mechanism 23 strips the signature from the cylinder 22 and the signature passes to the chopper mechanism which places a further fold in the signature at a right angle to the jaw folds.

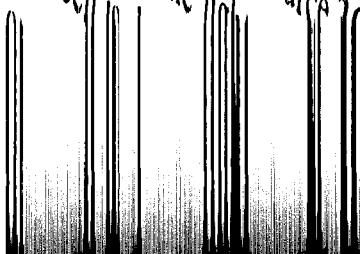

respect to cell S3, this cell normally looks at the reflective surface 40 on the timing disc 34 and it is only for the brief period when the openings 42, 43 pass beneath the cell S3 that the cell is not illuminated.

FIG. 5B illustrates a situation in which a signature is wrongfully present (a WP fault) at the delivery cylinder inspection station. Thus, the photocell S4, instead of seeing a non-reflective surface at time $t_2$ due to the properly timed absence of a signature, is illuminated by a wrongfully present signature. The wrongful presence of the signature will, in a manner hereinafter described, actuate the logic circuit to generate a voltage which activates a relay to shut down the press and folder.

FIG. 5C illustrates the condition of the photocells when there is both a wrongfully present (WP) signature and a wrongfully absent (WA) signature at the delivery cylinder inspection station. Thus, as in the manner described in connection with FIG. 5B, the cell S4 is illuminated at $t_2$ by the wrongful presence of a signature. In addition, the cell S4 is not illuminated at time $t_1$ when a signature should be present and light should be reflected to the photocell. The existence of the two faults at the delivery cylinder inspection station results in actuation of the relay to stop the press and folder.

Referring now more in detail to a typical operating cycle of the detection system, the system contemplates that a signature will be passing photocell S1 when cell S3 is looking at the opening 43 and the cell S2 is looking at darkness. Accordingly, the cell S4 must be positioned such that it is looking at a signature and receiving reflected light. In this condition, one of the non-reflective portions 38 on the surface of the cylinder 22 should be positioned beneath the signature which is reflecting light to the photocell S4.

When the opening 43 has passed beneath the photocell S3, the cell S3 will be illuminated by the reflective surface 40. This condition remains until the disc 34 has rotated by 180° at which time the opening 42 will be aligned with the cell S3 and tooth 44 will be aligned with cell S2. However, the delivery cylinder 22 will have rotated only by 90° so that, if the folder is functioning properly, the signature previously inspected by the photocell S4 will have passed beyond the photocell and the photocell should now be looking at the next adjacent non-reflective area 38 on the delivery cylinder. The condition of the photocells will now be shown at time $t_2$ in FIG. 5A. Thereafter, the cycle will be repeated.

It is to be noted that, for each revolution of the timing disc 34, the photocell S4 inspects for both a wrongfully present signature and a wrongfully absent signature. The photocell S1 also makes two inspections for each revolution of the timing disc.

There is illustrated in FIG. 4 one form of a logic circuit, indicated generally by the reference numeral 50, which may be utilized in the detection system. It is to be understood that other circuits could be used as well. The circuit shown in FIG. 4 is based on the truth table illustrated in FIG. 6.

Referring now more in detail to FIG. 4, the logic circuit includes a pair of inverters 51, 52, a pair of exclusive OR gates 53, 54, a NAND gate 55 and a NAND gate 56. A switch 57 is provided to deactivate the photocell S1 when no chopper fold is to be made. The logic circuit is also connected to an inverter amplifier 58 and a relay 59 which, when activated, shuts down the press and the folder. A switch 60 may also be incorporated in the circuit to deactivate the entire detector system in the event it is desired to operate the folder without operation of the detector.

Referring now in detail to the operation of the logic circuit, the condition of the circuit will be first considered at the time $t_o$ when no inspections are to be made. At this point in time, the photocell S3 receives reflected light from the surface 40 and produces a positive or binary 1 signal at point B which is inverted by the inverter 52 to obtain a binary 0 signal at point K. Consequently, the output at point L of the NAND gate 56 has a binary 1, irrespective of the signal at the other lead J of the gate. The driver amplifier 58 inverts the signal producing a binary 0 at point M which does not operate the relay 59. Accordingly, assuming the switch 60 is closed, a no-alarm condition is present.

Taking next the condition of the circuit at the time $t_1$ when an inspection for wrongful absence is to be conducted, the disc 34 has rotated to the position where the opening 43 is aligned with the photocell S3 so that the photocell no longer sees light. Accordingly, point B has a binary 0 and point K has a binary 1. Therefore, the output of the device 56 depends upon the signal at point J. Since, if the system is functioning properly, a signature is passing by photocell S1 thereby interrupting the light from the source 36, the photocell S1 should see darkness and produce a binary 0 at point A causing a binary 1 at the output C of the inverter 51. The photocell S2 continues to look at the non-reflective background 46 on the cross-perforator cylinder 16 and therefore sees darkness causing a binary 0 at point D. These unmatched logic signals at the inputs to the device 53 produces a binary 1 at point F since the gate 53 will produce a binary 1 whenever its two input signals do not match and will produce a binary 0 whenever its input signals match, regardless of whether they are both 0 or both 1. Assuming the switch 57 is closed, the binary 1 from the gate 53 is conducted to lead I at the device 55.

The logic at the other lead G to the device 55 is determined by the photocell S4. At the time $t_1$, a signature should be passing beneath S4 if there is no wrongful absence and S4 should see the light reflected from that signature which will create a binary 1 at the point E. Since it will be remembered that the output of the photocell S2 at the time $t_1$ is a binary 0, the two inputs to the device 54 are unmatched and the output at point G is a binary 1. The gate 55 is such as to produce a binary 1 at its output J if, and only if, one or more of its inputs has a binary 0. Accordingly, at the time $t_1$, a binary 0 is produced at the point J. The device 56 has a binary 1 as an output at L which is inverted by the inverter amplifier 58 to a zero with the result that the relay 59 is not operated.

Considering now the time $t_2$ when a test for wrongful presence of a signature is to be conducted, the disc 34 has rotated to a position where the opening 42 and the tooth 44 are aligned with the cells S3 and S2. Accordingly, the photocell S2 sees light and establishes a binary 1 at the point D. S1 sees light because there is no signature passing between it and the light source 36 and a binary 1 is therefore produced at A which is inverted to a binary 0. Since the device 53 has unmatched inputs, a binary 1 is produced as an output. If the system is functioning properly, S4 should be looking at one of the non-reflective areas 38 on the cylinder 22 and see darkness which produces a binary 0 at E. Since the device 54 has unmatched inputs, a binary 1 is produced as an output. Accordingly, the device 55 has a binary 1 at both of its inputs and produces a binary 0 at point J. S3, which is looking at the opening 42, produces a binary 0 which is inverted to a binary 1. The device 56 produces a binary 1 at its output. The binary 1 is inverted by the device 58 to a binary 0 and, no fault having been detected, the relay is not activated.

From the foregoing, the conditions present at each point in the circuit when a fault is detected can readily be determined. For example, assuming a wrongfully present signature is detected by the photocell S4, the signals at each point in the circuit are given in the following table:

| POINT | A | B | C | D | E | F | G | H | I | J | K | L | M | N | P |
|---|---|---|---|---|---|---|---|---|---|---|---|---|---|---|---|
| SIGNAL | 1 | 0 | 0 | 1 | 1 | 1 | 0 | 1 | 1 | 1 | 1 | 0 | 1 | 1 | 1 |

The binary 1 at point E signals a wrongful presence which generates a voltage to actuate relay 59 to stop the press.

Similarly, assuming a wrongfully absent signature is detected at the photocell S4, the signals at each point in the circuit would be as follows:

| POINT | A | B | C | D | E | F | G | H | I | J | K | L | M | N | P |
|---|---|---|---|---|---|---|---|---|---|---|---|---|---|---|---|
| SIGNAL | 0 | 0 | 1 | 0 | 0 | 1 | 0 | 1 | 1 | 1 | 1 | 0 | 1 | 1 | 1 |

In this situation, the binary 0 at point E signals a wrongful absence to stop the press.

It is to be noted that, with the described system, a jammed condition will be detected anywhere in the folder at the earliest possible moment. The wrongful presence or absence of the first signature immediately activates the detector to shut down the press. As a result, less severe jams are encountered and it is possible to run the press and the folder at significantly higher operating speeds. Moreover, the system is fail-safe in that, should any of the photocells burn out or otherwise become inoperative, the system automatically will shut down.

To prevent the system from shutting down the folder when the folder is first started, the system should be designed to be activated when the first signature passes under the photocell S4. To avoid prematurely activating the system in the chopper mode, a ten second timer may be employed. This timer may be associated with the stripper throwoff mechanism and activated when the photocell S4 first begins to look at signatures. At the end of the timer cycle, the photocell S1 should be activated and the detection system should then be operative for the remainder of the run.

Referring now to FIG. 7 there is illustrated the detection system incorporated in a modified form of folder. In this folder an additional photocell S5 and an associated light source 64 are provided. As in the embodiment of FIG. 1, the photocell S1 looks at chopper folds while the photocell S5 is arranged to look at tabloid folds. The leads from the photocell S1 are adapted to be connected to the logic circuit when the leads from S5 are disconnected from that circuit and vice versa. A movable chopper stop 66 is employed to connect or disconnect the appropriate leads in any suitable fashion.

Figure 8:
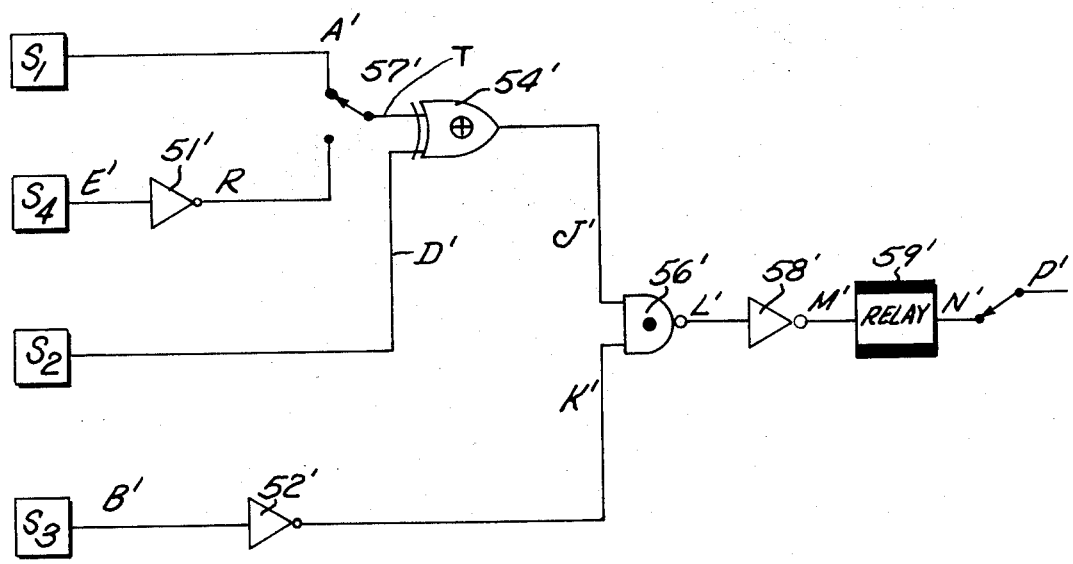
FIG. 8 is a schematic diagram of another form of a logic circuit which may be used in the detection system.

A modified circuit is shown in FIG. 8, and in which either photocell S1 or S4 is used with S2 and S3 but S1 and S4 are never used simultaneously.

Photocells S1 or S4 are selected by means of a switch 57', to serve as an input T for an exclusive OR gate 54'. Photocell S2 is connected to a second input D' of exclusive OR gate 54'. When the signals on inputs T and D' differ from each other, irrespective of which input has the binary 1, and if at the same time photocell S3 is causing an inspection to occur, there must be a fault occurring. Upon occurrence of a fault condition, a binary 1 is produced at an output terminal J' of exclusive OR gate 54' and a relay 59' will be operated.

When switch 57' is in a position marked as A' in FIG. 8, photocell S1 is in use. A wrongful presence at S1 corresponds to a binary 0 at terminal T and a binary 1 at terminal D'. A wrongful absence at S1 corresponds to a binary 1 at terminal T and a binary 0 at terminal D'. Either fault condition causes a shutdown at inspection time.

When switch 57' is in a position denoted by reference letter R, photocell S4 is in use. A wrongful presence at S4 corresponds to binary 0 at terminal T and a binary 1 at terminal D'. A wrongful absence at S4 corresponds to a binary 1 at terminal T and a binary 0 at terminal D'. Either fault causes a shut down at inspection time.

If J' is a binary 1 at any time that photocell S3 causes an inspection to occur, the relay 59' is energized, in accordance with the following details: Photocell S3 produces a binary 0 at its output terminal B' whenever an inspection is to be made. Terminal B' connects to an inverter 52' which inverts the binary 0 to a binary 1 at output terminal K' of inverter 52'. Terminal K' of inverter 52' and terminal J' of exclusive OR gate 54' are connected to separate inputs of a NAND gate 56' whose output terminal is L'. Whenever both terminal J' and terminal K' apply binary 1 signals to the inputs of NAND gate 56', its output terminal has a binary 0, which is connected to an inverting booster amplifier 58' having an output terminal M'. This condition corresponds to a fault situation; the output terminal M' has a binary 1 which is connected to and energizes relay 59' to indicate a fault. Relay 59' may be a latching relay if desired.

When the circuit of the second embodiment is employed, photocell S4 is preferably located on a different side of the gripper jaw delivery cylinder 22, as shown in dotted lines in FIG. 1.

It will be apparent to those having ordinary skill in the art that modifications and changes in the preferred embodiment may be made. For example, although an optical system employing a timing disc and photocells has been disclosed as the means for providing the signals which, in effect, tell the photocells S4 and S1 when to look at the passing scene, other means might be employed. For example, a programmed arrangement which actuates the inspection stations at predetermined programmed times might be used. Also, a mechanical arrangement of cams and switches could be utilized to render the inspection stations operative at predetermined times and in a predetermined sequence. Still further, a fluidic system might be used instead of photocells and electrical logic.

While a preferred embodiment of the invention has been disclosed, it is not intended that the disclosed embodiment or the terminology employed in describing it is to be limiting but, rather, it is my desire to be limited only by the scope of the appended claims.

I claim:

1. A jam detection system for a folder, said folder including a plurality of rotatable cylinders adapted to receive signatures and perform operations thereon, said jam detection system comprising, inspection means including means operative for inspecting for the presence and absence of signatures at a station in said folder, said inspection means including means for generating a time-varying signal in response to the inspected condition;

reference means for generating a predetermined time-varying reference signal to characterize unjammed operation of the folder, said reference signal repeating cyclically in synchronism with said rotatable cylinders to specify, as a function of time, the presence and absence of signatures that would properly occur at said station if said folder were not jammed;

timing means operating in sychronism with said rotatable cylinders, said timing means being operative for generating signals in a predetermined sequence to dictate time intervals when said jam detection system is to be enabled; and circuit means for receiving signals from said inspecting means, from said reference means, and from said timing means, said circuit means being operative to compare said signals from the inspecting means and from the reference means for stopping rotation of said cylinders when signals in a predetermined combination are received from said inspecting and reference means during said time intervals.

2. The combination of claim 1, wherein said inspecting means comprises photocell means generating signals in response to the presence and absence of light.

3. The combination of claim 2 wherein said timing means include photocell means generating signals in response to the presence and absence of light.

4. The combination of claim 3 wherein said timing means further include surface means having reflective and non-reflective areas thereon;

said surface means and said timing photocell means being movable relative to each other whereby said timing photocell means sequentially views the reflective and non-reflective areas on said surface means.

5. The combination of claim 4 wherein said surface means comprises a timing disc rotatable with said cylinders.

6. The combination of claim 2 wherein said station is at one of said cylinders upon which said signatures are deployed and said one cylinder includes non-reflective areas thereon, said photocell means being arranged to look at said non-reflective areas as said cylinder rotates; and wherein said inspecting means further comprises light source means for directing light onto said cylinder whereby said photocell means either receives light reflected from a signature on the cylinder or receives no light when a non-reflective area is exposed.

7. The combination of claim 2 wherein said reference means include photocell means generating signals in response to the presence and absence of light.

8. The combination of claim 7 wherein said reference means further include surface means having reflective and non-reflective areas thereon;

said surface means and said reference photocell means being movable relative to each other whereby said reference photocell means sequentially views the reflective and non-reflective areas on said surface means.

9. The combination of claim 8 wherein said surface means comprises a disc rotatable with said cylinders.

10. The system of claim 1 wherein said inspecting means comprises photocell means and a light source so arranged that signatures pass therebetween whereby the light to the photocell means is interrupted.

11. A jam detection system for a folder, said folder including a plurality of rotatable cylinders adapted to receive signatures and perform operations thereon, said jam detection system comprising, sensing means for sensing the presence and absence of signatures at a predetermined point in the folder and generating, during the cyclic period of passage of each signature past said point, time-varying signals in response to the sensed condition;

reference means for generating predetermined time-varying reference signals specifying a sequential pattern of both presence and absence of the signatures characterizing proper travel past said point, comparator means receiving said signals from said sensing means and from said reference means for comparing them and producing an output signal indicative of improper travel when the signals differ; and control means responsive to said output signal for controlling said folder to stop the operations upon an indication of improper travel.

12. The jam detection system for a folder as defined in claim 11 and further comprising sampling means connected to at least one of said sensing, reference, comparator, and control means for rendering the system selectively able and unable to control the folder during different portions of the cyclic period during which a signature passes said inspection point, said sampling means comprising means communicating with said folder for synchronizing the sampling means with said folder.

13. A method for detecting jams in a folder as signatures are successively processed in cycles through the folder, said method comprising the steps of:

cyclically and automatically establishing model information in synchronism with the processing of the signatures, said model information corresponding to unjammed operation of the folder and stating at a first predetermined phase of each cycle that a signature ought then to be present at a predetermined location in the folder;

automatically inspecting for the presence of a signature at said predetermined location when a signature ought, according to said model information, to be present;

automatically modifying the model information upon each cycle to state that a signature ought to be absent at the same predetermined location at a second predetermined phase of each cycle;

automatically inspecting for the absence of a signature at the same predetermined location when a signature ought, according to the modified model information, to be absent;

automatically discontinuing operation of the folder when either a wrongful presence or a wrongful absence of a signature is detected; and automatically modifying the model information upon a succeeding cycle to state at the first predetermined phase thereof that a succeeding signature ought then to be present at the same predetermined location.

14. The method of claim 13, wherein each of the steps of inspecting for the presence and absence of signatures comprises a step of directing light toward the path of travel of the signatures and detecting, at a detection place, the presence or absence of light as affected by impingement and non-impingement, before the light arrives at the detection place, of the light on the signatures, and wherein each of said steps of inspecting comprises a step of synchronizing the inspection with the folder.

15. The method of claim 13 wherein each of the steps of inspecting for the presence and absence of signatures comprises a step of directing light to the predetermined location each time a signature should be present and each time a signature should be absent, and detecting, at a detection place, the presence or absence of light as affected by impingement and non-impingement, before the light arrives at the detection place, of the light on the signatures, and wherein each of said steps of inspecting comprises a step of synchronizing the inspection with the folder.

* * * * *